US012558621B2

(12) United States Patent
Otomo

(10) Patent No.: US 12,558,621 B2
(45) Date of Patent: Feb. 24, 2026

(54) RECORDING MEDIUM AND INFORMATION PROCESSING DEVICE

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 281 days.

(21) Appl. No.: 18/471,653

(22) Filed: Sep. 21, 2023

(65) Prior Publication Data

US 2024/0009562 A1     Jan. 11, 2024

Related U.S. Application Data

(63) Continuation of application No. PCT/JP2022/012377, filed on Mar. 17, 2022.

(30) Foreign Application Priority Data

Mar. 26, 2021     (JP) ................................. 2021-052727

(51) Int. Cl.
*A63F 13/533*     (2014.01)
*A63F 13/52*     (2014.01)
*A63F 13/822*     (2014.01)

(52) U.S. Cl.
CPC ............ *A63F 13/52* (2014.09); *A63F 13/533* (2014.09); *A63F 13/822* (2014.09)

(58) Field of Classification Search
None
See application file for complete search history.

(56) References Cited

U.S. PATENT DOCUMENTS

| | | | | |
|---|---|---|---|---|
| 2009/0201299 A1* | 8/2009 | Bhogal | ................... | A63F 13/30 |
| | | | | 345/474 |
| 2020/0023273 A1* | 1/2020 | Tsurusaki | .............. | A63F 13/822 |
| 2020/0086218 A1* | 3/2020 | Nakano | ................... | A63F 13/35 |

(Continued)

FOREIGN PATENT DOCUMENTS

| | | |
|---|---|---|
| JP | 6544474 B1 | 7/2019 |
| JP | 2022-32398 A | 2/2022 |

OTHER PUBLICATIONS

"Ver.10.3 Update information released! Monster Strike Official Website" Jan. 29, 2018, https://www.monster-strike.com/news/20180125_3html (15 pages).

(Continued)

*Primary Examiner* — Damon J Pierce
(74) *Attorney, Agent, or Firm* — Osha Bergman Watanabe & Burton LLP

(57)     ABSTRACT

A non-transitory computer readable recording medium storing instructions that cause a computer to function as: a storage device that stores a usage status of each of player's possessed contents in a game; and a control device that: extracts, from the possessed contents, a content group having the usage status that does not satisfy a specific condition, receives, from a player via a terminal device including a display, a first request to browse the possessed contents, and in response to the first request, causes the display of the terminal device to display a screen including the possessed contents except the content group, the first request being a request for selecting, from the possessed contents, a content to be used in the game.

11 Claims, 10 Drawing Sheets

(56) References Cited

U.S. PATENT DOCUMENTS

2020/0139246 A1\*   5/2020   Kinney ................... A63F 13/35
2021/0197086 A1\*   7/2021   Asuna ................... A63F 13/798

OTHER PUBLICATIONS

"What is the best way to use the 'Monster Strike' gimmick? [Strategy Diary]", Akiba Souken, Aug. 2018, https://akiba-souken. com/article/35794/ (6 pages).
International Search Report issued in corresponding International Application No. PCT/JP2022/012377 mailed May 17, 2022 (7 pages).
Written Opinion issued in corresponding International Application No. PCT/JP2022/012377 mailed May 17, 2022 (5 pages).

\* cited by examiner

RECORDING MEDIUM AND INFORMATION PROCESSING DEVICE

BACKGROUND

Technical Field

The present invention relates to a recording medium storing instructions and an information processing device.

Description of Related Art

Terminal devices that provide a player with a game in which the player can acquire characters, items, and other such contents are well known.

In relation to this, Patent Literature 1 discloses a technique in which a player can acquire contents by executing a lottery game, a quest, or the like.

PATENT LITERATURE

Patent Literature 1: Japanese Patent No. 6,544,474

In such a game, the player can possess a large amount of contents acquired in lottery games, quests, and so forth by continuing to play the game. Accordingly, the browsability of the possessed contents would be diminished (browsing would be more complicated) when the player selects a content to be used from the possessed contents.

SUMMARY

One or more embodiments of the present invention provide a technological improvement over such conventional technologies as discussed above. In particular, one or more embodiments of the present invention provide an information processing device and a recording medium storing instructions that improve functionality of a control device controlling a display and provide high browsability (reduce complexity) to the player who selects a content to be used from the possessed contents on a screen displayed by the display, which increases operability of the display and/or a terminal device comprising the display.

According to a first mode of the present invention, there is provided a non-transitory computer readable recording medium storing instructions that cause a computer to function as a storage unit for storing a usage status of each of player's possessed contents in a game, an extraction unit (i.e., a control device) for extracting, from the possessed contents, a content group having the usage status that does not satisfy a specific condition, a reception unit (i.e., the control device) for receiving, from a player via a terminal device comprising a display, a first request to browse the possessed contents, and a control unit (i.e., the control device) for causing, in response to the first request, the display of the terminal device to display a screen including the possessed contents except the content group, wherein the first request is a request for selecting, from the possessed contents, a content to be used in the game.

In a second mode of the present invention, the usage status includes a number of uses during a period from a specific time in the past (or specific prior time) up to the present (or present time).

In a third mode of the present invention, the number of uses is a number of uses by the player in the game, and the specific condition is that the number of uses is equal to or greater than a first specific number of times.

In a fourth mode of the present invention, the number of uses is a number of uses by a plurality of players in the game, and the specific condition is that the number of uses is equal to or greater than a second specific number of times.

In a fifth mode of the present invention, the number of uses is a number of uses in a quest.

In a sixth mode of the present invention, the number of uses is a number of uses in clearing (or completing) a quest.

In a seventh mode of the present invention, the number of uses is a number of times a breeding game has been played.

In an eighth mode of the present invention, the reception unit receives, from the player via the terminal device, a second request to browse the content group after receiving the first request, and the control unit causes, in response to the second request, the display of the terminal device to display the content group on the screen (or another screen).

In a ninth mode of the present invention, the extraction unit excludes, from the content group, any content having the usage status that does not satisfy the specific condition and to which an evolved content has been added via a game update during a period from a specific time in the past (or specific prior time) up to the present (or present time).

In a tenth mode of the present invention, the extraction unit excludes, from the content group, any content having the usage status that does not satisfy the specific condition and having been acquired by the player during a period from a specific time in the past (or specific prior time) up to the present (or present time).

The information processing device according to an eleventh mode of the present invention comprises a storage unit for storing a usage status of each of player's possessed contents in a game, an extraction unit (i.e., a control device) for extracting, from the possessed contents, a content group having the usage status that does not satisfy a specific condition, a reception unit (i.e., the control device) for receiving, from a player via a terminal device comprising a display, a first request to browse the possessed contents, and a control unit (i.e., the control device) for causing, in response to the first request, the display of the terminal device to display a screen including the possessed contents except the content group, wherein the first request is a request for selecting, from the possessed contents, a content to be used in the game.

With one or more embodiments of the present invention, it becomes to improve functionality of a control device controlling a display and to provide high browsability (reduce complexity) to the player who selects a content to be used from the possessed contents on a screen displayed by the display, which increases operability of the display and/or a terminal device comprising the display.

DETAILED DESCRIPTION OF EMBODIMENTS

Figure 1:
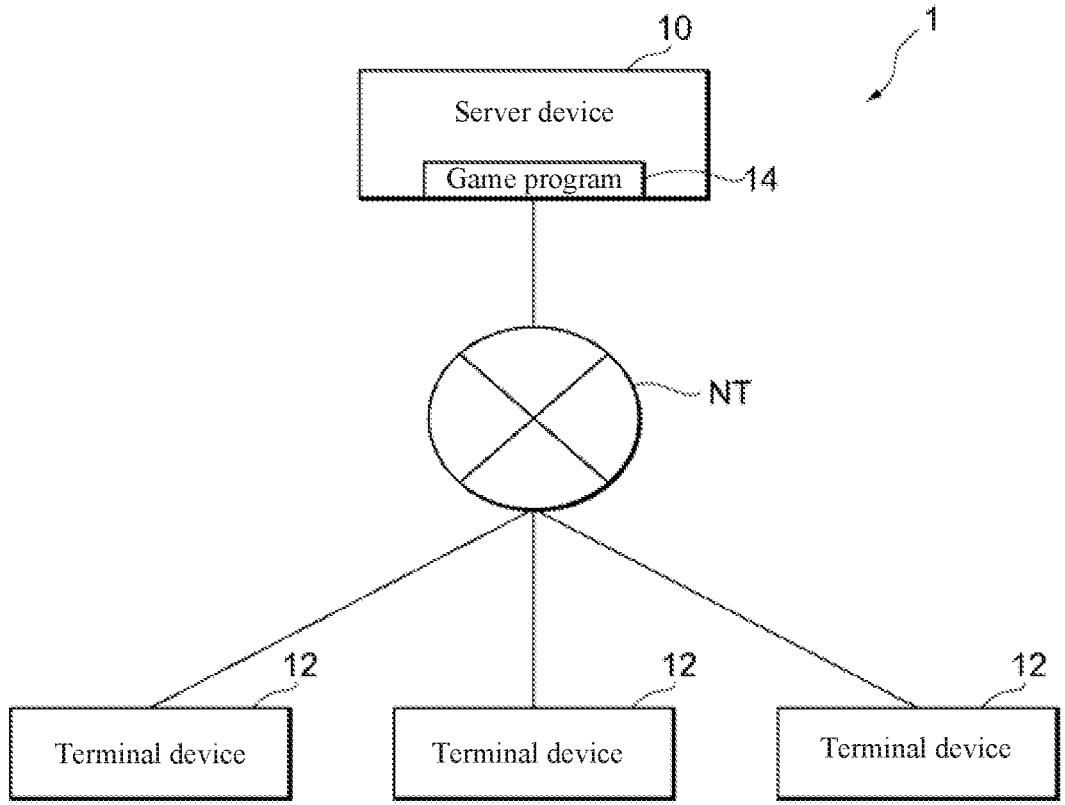
FIG. 1 is a block diagram showing an example of the overall configuration of a game system according to a first embodiment.

A number of embodiments of the present invention will be described below with reference to the appended drawings. To facilitate understanding of the description, components and steps that are the same will be numbered the same as much as possible in the drawings, and redundant description will be omitted.

First Embodiment

A first embodiment will be described now.
Overall Configuration

FIG. 1 is a block diagram showing an example of the overall configuration of a game system 1 according to the first embodiment.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing the game program 14 (i.e., instructions), or of the game program 14 itself, to the player of each terminal device 12 via the communication network NT. In the first embodiment, the server device 10 provides the game program 14 itself to the players of the terminal devices 12.

Each terminal device 12 is an information processing device belonging to a player, and is an information processing device that provides a game to a player by executing the game program 14 received from the server device 10 after the program has been installed. Examples of these terminal devices 12 include video game machines, arcade game machines, mobile phones, smartphones, tablets, personal computers, and various other such devices.
Hardware Configuration FIG. 2 is a diagram schematically showing an example of the hardware configuration of the server device 10.

Figure 2:
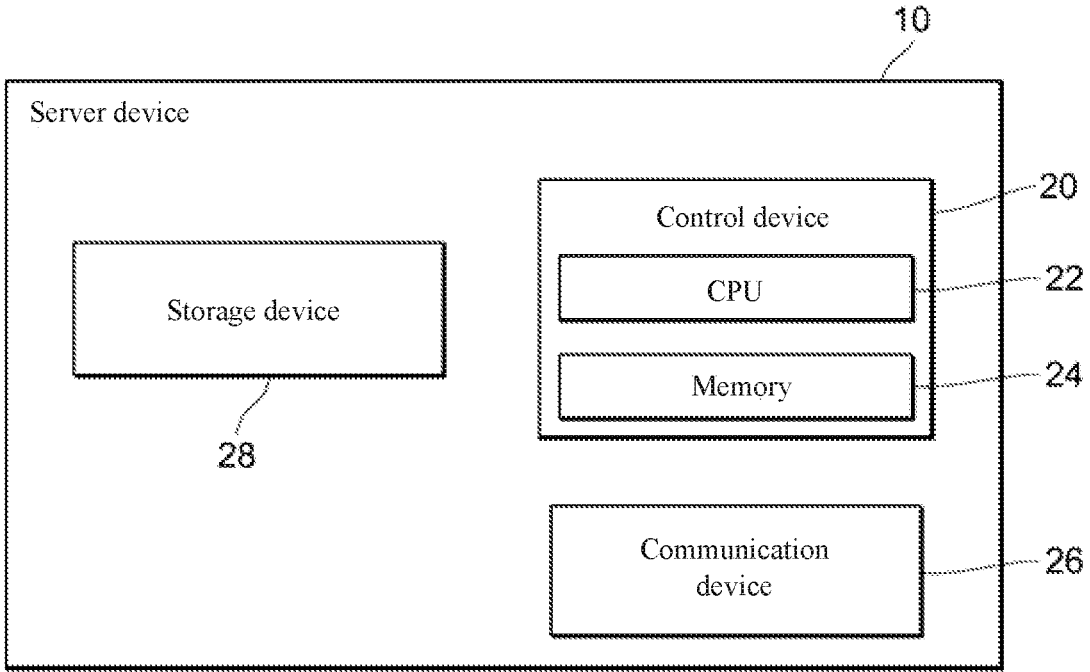
FIG. 2 is a diagram schematically showing an example of the hardware configuration of a server device.

As shown in FIG. 2, the server device 10 comprises a control device 20, a communication device 26, and a storage device 28. The control device 20 mainly comprises a CPU (central processing unit) (hardware processor) 22 and a memory 24.

In the control device 20, the CPU 22 functions as various functional units by executing specific programs or the instructions stored in the memory 24, the storage device 28, or the like. These functional units will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of programs or the instructions and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, along with additionally comprising an operating unit (or user interface), a display device (or display), and a sound output device, for example.

Figure 3:
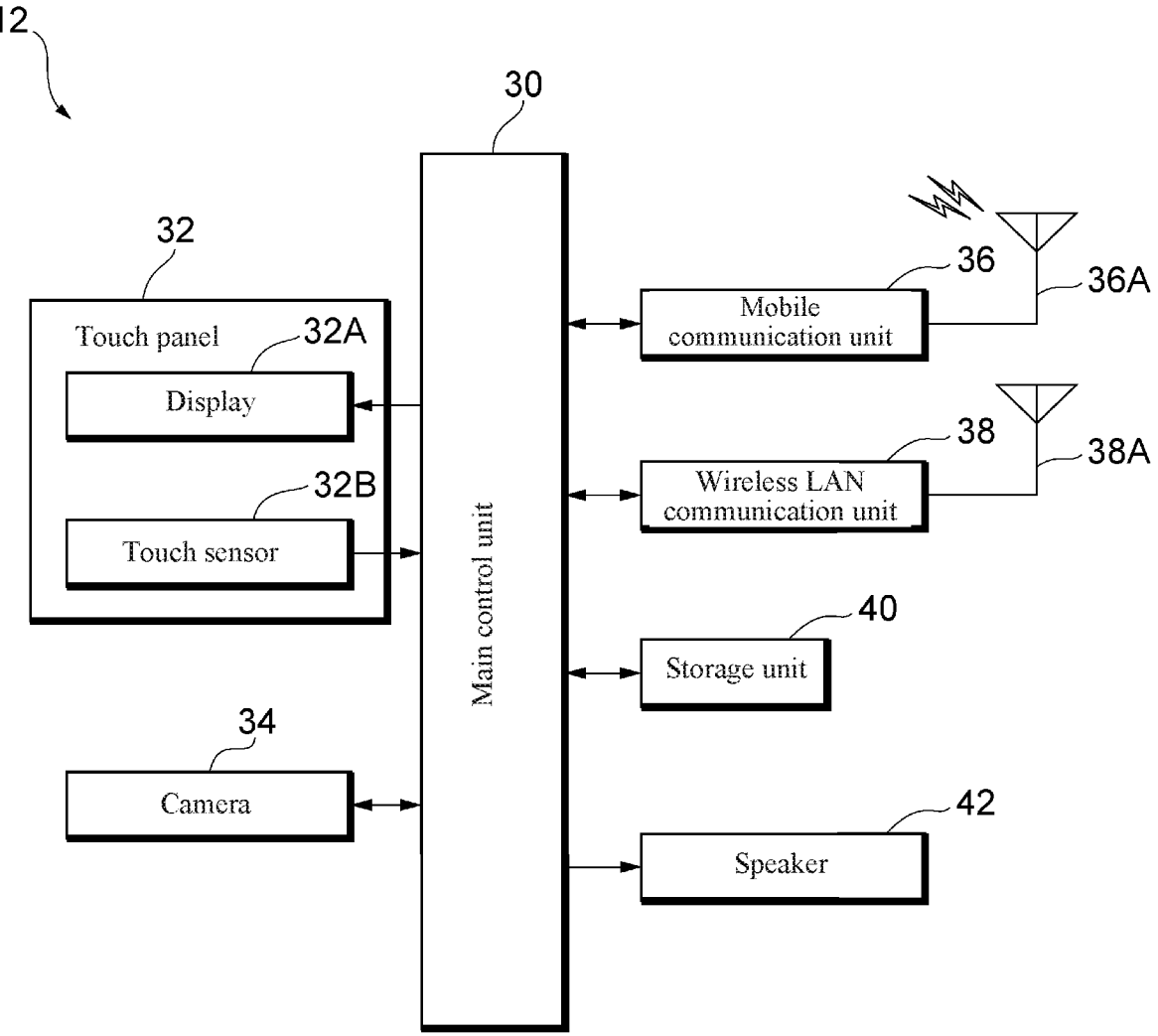
FIG. 3 is a diagram showing an example of the hardware configuration of a smartphone, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, a camera 34, a mobile communication unit 36, a wireless LAN communication unit 38, a storage unit 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In the first embodiment, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of programs or the instructions and data, such as the game program 14, and play data indicating player information or the progress of the game in the game program 14. This play data may be stored in the server device 10.

The speaker 42 has the function of outputting game sounds and so forth.

Game Summary

Games according to the first embodiment include lottery games and quests in which a player can acquire characters as an example of a content, breeding games in which possessed characters are strengthened or evolved, and sales games in which possessed characters are sold. These lottery games are sometimes referred to as gacha (loot box), raffle, summoning, or the like. These quests are sometimes referred to as battle games, dungeons, searches, missions, or the like.

A lottery game according to the first embodiment is a game in which a player can earn one or more randomly selected characters from the lottery target character group, in accordance with an instruction (request) from a player to execute a lottery game. This lottery is executed on the basis of consumption of monetary items possessed by the player. Examples of these monetary items include charged items (paid stones, paid tickets, etc.) and non-charged items (free stones, free tickets, etc.). A charged item is a paid item granted to the player on the basis of a payment made with money, prepaid card, credit card, or the like. Also, a non-charged item is a free item given to the player in the game. A non-charged item has the same value as, for example, a charged item.

Also, a quest according to the first embodiment is a game in which a team composed of one or more characters possessed by a player and enemy characters play against each other on the basis of an instruction (request) from the player to execute the quest.

For example, in an organization menu for organizing characters to be used in the quest, the player can organize characters to be used in the quest by arbitrarily selecting one or more characters from his possessed characters.

These quests are executed on the basis of the consumption of the current stamina associated with the player. When the player clears (or completes) the quest, that is, when the hit points of an enemy character (boss character) fall to zero or less, the player can acquire a clearance reward (or completion reward). Examples of clearance rewards include non-charged items (free stones, free tickets, etc.), coins, enemy characters (evolution resource characters) that appear in quests, player experience points for raising the player rank, and so on.

A breeding game according to the first embodiment is a game in which a resource character (resource content) is fused with a base character (base content). In this fusion, resource characters are lost from the player's possessed characters in exchange for the ability to breed base characters.

In a breeding game according to the first embodiment, strengthening fusion is performed as a first character fusion, by which the ability parameters of the base character are changed by consuming a certain number of coins and a resource character arbitrarily selected by the player.

For example, if the player arbitrarily selects a base character and a resource character from his possessed characters in the strengthening fusion menu in a breeding game, the player can perform strengthening fusion on the condition that the player possesses a specific number of coins.

Also, with the breeding game according to the first embodiment, evolution fusion is performed as a second character fusion, by which a base character is evolved into an evolved character (evolved content), which is a different character, by consuming a cost associated with that base character in advance.

For example, when the player arbitrarily selects a base character from his possessed characters in an evolution fusion menu in the breeding game, the player can perform evolution fusion on the condition that the player possesses the cost corresponding to the base character (evolution resource characters, coins, etc.) in advance.

Also, a sales game according to the first embodiment is a game in which a player can acquire coins corresponding to a selected character in exchange for losing that selected character from the possessed characters, on the basis of an instruction (request) to sell a possessed character selected by the player.

For example, the player can sell a selected character by arbitrarily selecting one or more possessed characters in a selling menu for selling possessed characters.

Also, in the game according to the first embodiment, new characters (contents) are added, the ability parameters of existing characters are advantageously changed, or new game events (such as quests) appear via a game update. This game update is sometimes called a version upgrade or a version update. For example, a new character ID that is different from that of existing characters may be given to a new character.

For example, after the game has been updated, the player can possess (earn) a new character added through this game update by means of a lottery game, a quest, or second character fusion (evolution fusion).

Functional Units

Figure 4:
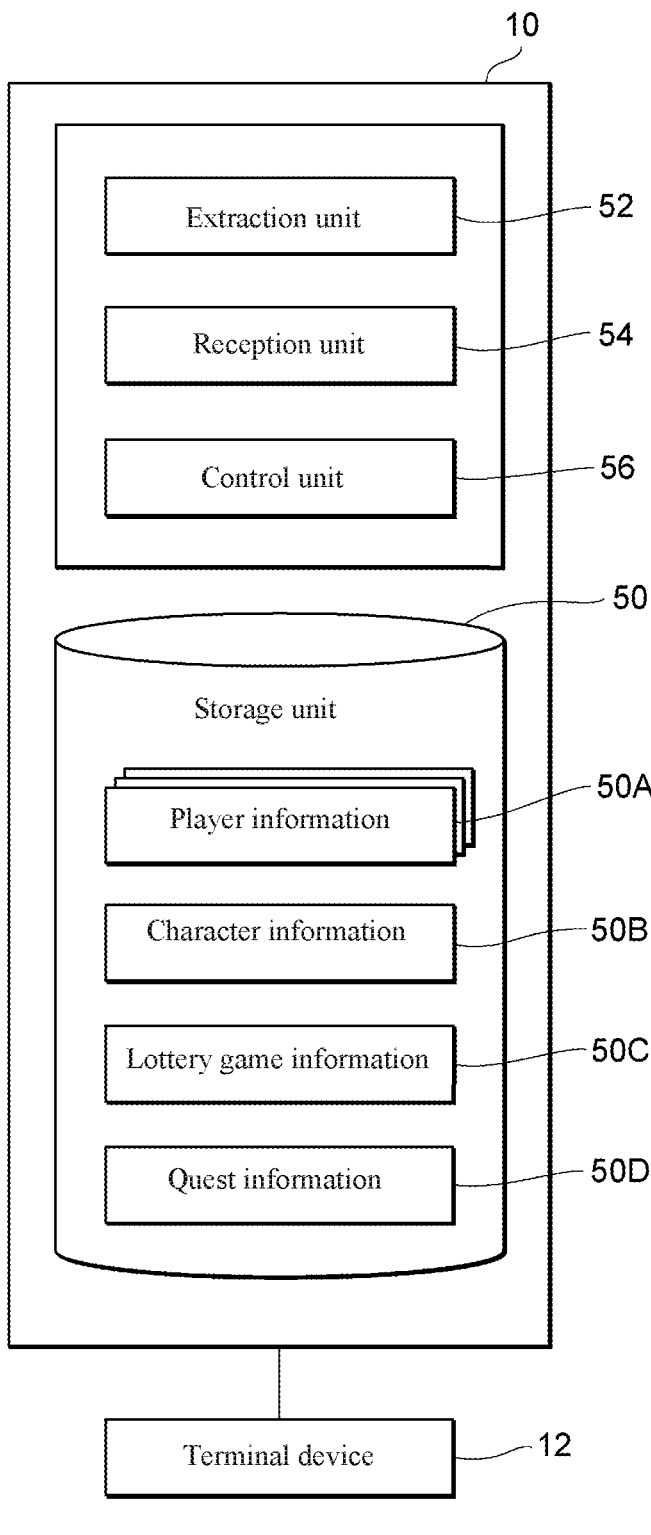
FIG. 4 is a block diagram schematically showing an example of functional units of a server device.

FIG. 4 is a block diagram schematically showing an example of the functional units of the server device 10.

As shown in FIG. 4, the server device 10 comprises, as functional components, a storage unit 50, an extraction unit 52, a reception unit 54, and a control unit 56. The storage unit 50 is realized in the form of one or more storage devices 28. Functional units other than the storage unit 50 are realized when the control device 20 executes the game program 14 stored in the storage device 28 or the like.

The storage unit 50 has the function of storing player information 50A, character information 50B, lottery game information 50C, quest information 50D, and the like.

Player information 50A is stored for each player in association with the player ID of that player. This player information 50A includes, for example, the player's name, age, player rank, possessed content information, stamina information, and so on.

Possessed content information includes possessed character information, possessed item information, possessed coin information, and so forth. Possessed character information includes the character ID of each character possessed by the player and the ability parameters (level, specific parameter, hit points, attack power, defense power, etc.) of each character, acquisition date/time, characters being organized, and usage status. A possessed character is a character that the player can use for quests and breeding games. Characters being organized include one or more characters from the possessed characters that are organized into a team.

Usage status is stored for each possessed character, and includes, for example, the number of times a character is used during a period from a specific time in the past or a specific prior time (such as a day, a week, a month, or a year ago) up to the present. The number of uses may include, for example, the number of uses by the player in a game, or the number of uses by a certain plurality of players in a game.

More specifically, the number of uses is, for example, the number of times a possessed character was used in a quest, the number of times it was used in clearing a quest (organized in a team), the number of times a breeding game (strengthening fusion or evolutionary fusion) has been performed on a base character (base content), etc. Examples of the "plurality of players" include a plurality of players who satisfy a specific relationship with the player (such as a friend relationship in the game), a plurality of players whose player rank is close to that of the player, a plurality of players whose player rank is high, or some or all of the players who are playing the game. The plurality of players may or may not include the player himself.

Possessed item information includes the item ID and number of each item possessed by the player. These items include paid stones, paid tickets, free stones, free tickets, stamina recovery items, and the like. Possessed coin information includes the number of coins possessed by the player.

Stamina information includes the player's current stamina value and stamina upper limit value. The current stamina value is a value consumed when the player executes various quests. This current stamina value increases by a specific amount (such as 1) after a certain period of time (such as 3 minutes) elapses, and recovers to the stamina upper limit value. Also, this current stamina value is recovered beyond the stamina upper limit value when the player consumes paid stones, free stones, stamina recovery items, and so on. This stamina upper limit value increases along with the player rank. The player rank increases, for example, when the player gains player experience points by clearing quests.

Character information 50B is stored for each character in association with the character ID of that character. The character information 50B includes, for example, the character name and image, ability parameter information, rarity, and evolution fusion information. This character information 50B is updated from time to time via a game update by the game operator.

Ability parameter information includes the initial values and maximum values for the various ability parameters of a character.

Rarity may be represented by a number from 1 to 6, for example. This number may be indicated by the number of stars, for example. Here, a character with a high rarity is set with an ability parameter or the like that is advantageous in a game (such as a quest).

Evolution fusion information includes the character ID of an evolved character, the cost required to evolve into that evolved character (the cost associated in advance with the character), and the add date/time, which is the date/time when the evolved character is added via a game update. Cost includes the evolution resource character information or a number of coins. Evolution resource character information includes the evolution resource character ID and the value of the specific parameter required for an evolution resource. Add date/time includes, for example, the date and time when an evolved character was added via a game update by the game operator, or the date and time when the initial value or maximum value of an ability parameter was changed.

Lottery game information 50C is stored for each lottery game in association with the lottery game ID of the lottery game. The lottery game information 50C includes the lottery game name and price, lottery target information, and the like.

Price includes the number of monetary items consumed in order to execute the lottery game one time. For example, the price for a certain lottery game may be five paid items.

Lottery target information includes the character IDs of the characters constituting the lottery target character group of a lottery game, and the appearance frequency (weighting) associated with that character ID. Their appearance frequency may be represented by a number from 1 to 10, for example. The appearance frequency is set to a low numerical value for a character with a high rarity, and to a high numerical value for a character with a low rarity. A character (pickup character) that appears more frequently than other characters within the same rarity may be provided.

Quest information 50D is stored for each quest in association with the quest ID of that quest. The quest information 50D includes the quest name, consumed stamina value, enemy character information, clearance reward information, and the like.

Consumed stamina value includes the value required to execute the quest. This consumed stamina value is deducted from the player's current stamina value, and the higher the difficulty of the quest, the higher the consumed stamina value is, for example.

Enemy character information includes character IDs and ability parameters of the enemy characters that appear in a quest.

Clearance reward information includes the number of unpaid items (such as free stones) and coins that can be earned when a quest is cleared, the character IDs and drop rates of enemy characters (evolution resource characters) that can be earned, player experience points, and so forth. The drop rate is the probability that the player will earn an enemy character (evolution resource character), and the higher the difficulty of a quest, the higher this probability is.

The extraction unit 52 is a functional unit for extracting a specific content group from the possessed contents. In the first embodiment, the extraction unit 52 refers to the usage status and the possessed character information of the player information 50A and extracts, from the player's possessed characters, character groups whose usage status satisfies a specific condition (hereinafter referred to as "used character group") and character groups whose usage status does not satisfy a specific condition (hereinafter referred to as "unused character group"). This used character group is the character group obtained by subtracting the unused character group from the player's possessed characters. Examples of the specific condition here may include that the number of uses by the player in a game is at least a first specific number of times (such as twice) during a period from a specific time in the past up to the present, or that the number of uses by a plurality of players (such as four players) in the game is at least a second specific number of times (such as four times). That is, the extraction unit 52 extracts, from the possessed characters, an unused character group of characters that have not been used by the player during a period from a specific time in the past up to the present.

Also, in the first embodiment, the extraction unit 52 excludes from the unused character group any possessed characters to which an evolved character has been added via a game update during a period from a specific time in the past (such as a day, a week, or a month ago) up to the present. For example, the extraction unit 52 refers to the add date/time in the evolution fusion information of the character information 50B, excludes from the unused character group any characters to which evolved characters have been added during a period from a specific time in the past up to the present, and extracts these as the used character group. That is, the extraction unit 52 puts any characters to which an evolved character has been recently added into the used character group.

Also, in the first embodiment, the extraction unit 52 excludes from the unused character group any possessed characters acquired by the player during a period from a specific time in the past (such as a day, a week, or a month ago) up to the present. For example, the extraction unit 52 refers to the acquisition date/time in the possessed character information of the player information 50A, excludes from the unused character group any characters acquired by the player during a period from a specific time in the past up to the present, and extracts these as the used character group. That is, the extraction unit 52 puts any characters recently acquired by the player into the used character group. If the player possesses a character of the same type (such as a character with the same character ID) as a character acquired by the player during a period from a specific time in the past up to the present, the extraction unit 52 may put into the unused character group any characters acquired during a period from a specific time in the past up to the present.

The reception unit 54 is a functional unit for receiving operation instructions (requests) from the player. In the first embodiment, the reception unit 54 receives a request from the player to select a character to be used in the game from the possessed characters as a first request to browse the possessed characters. Examples of this first request include an operation instruction for organizing characters to be used in a quest, an operation instruction for executing a breeding game (selecting a base character), and so on.

Also, in the first embodiment, after receiving the first request, the reception unit 54 receives from the player a second request to browse the unused character group. Examples of this second request include an operation instruction to display an unused character group that is displayed after having been excluded from the possessed characters by the control unit 56. Examples of this operation instruction include pressing a display switch button of a tab associated with the unused character group, or the like.

The control unit 56 is a functional unit for controlling the entire game. In the first embodiment, in response to the first request received by the reception unit 54, the control unit 56 produces a display that excludes a group of characters (unused character group) extracted from the possessed characters by the extraction unit 52 whose usage status does not satisfy a specific condition. That is, when the player uses a possessed character in a breeding game, a quest, or the like, the control unit 56 displays, from among the possessed characters, a used character group whose characters the player has used during a period from a specific time in the past up to the present.

Also, in the first embodiment, in response to the second request received by the reception unit 54, the control unit 56 displays on the possessed character screen the character group (unused character group) extracted by the extraction unit 52 whose usage status does not satisfy a specific condition. For example, the control unit 56 switches from a screen displaying the used character group to a screen displaying the unused character group in response to the second request.

Also, the control unit 56 updates the usage status of the possessed characters in the possessed content information of the player information 50A. For example, when the player has executed a quest, the control unit 56 increases the number of uses of the possessed characters used in the quest by one. Also, for example, when the player has cleared a quest, the control unit 56 increases the number of uses of the possessed characters that were used (organized in the team) by one. Also, for example, the control unit 56 increases the number of uses of the possessed characters used as a base character by one when a breeding game (strengthening fusion or evolutionary fusion) has been played.

The control unit 56 may change the value by which the number of uses is increased according to the type of game in which the possessed characters are used. For example, the control unit 56 may increase the number of uses of the possessed characters used in a quest by two, and increase the number of uses of the possessed characters used as base characters in a breeding game by one.

Also, when the date in the real world changes, for example, the control unit 56 subtracts (resets) the number of uses that were increased prior to a specific time in the past up to the present, and updates the number of uses during the period from a specific time in the past up to the present.

Processing Flow

Figure 5:
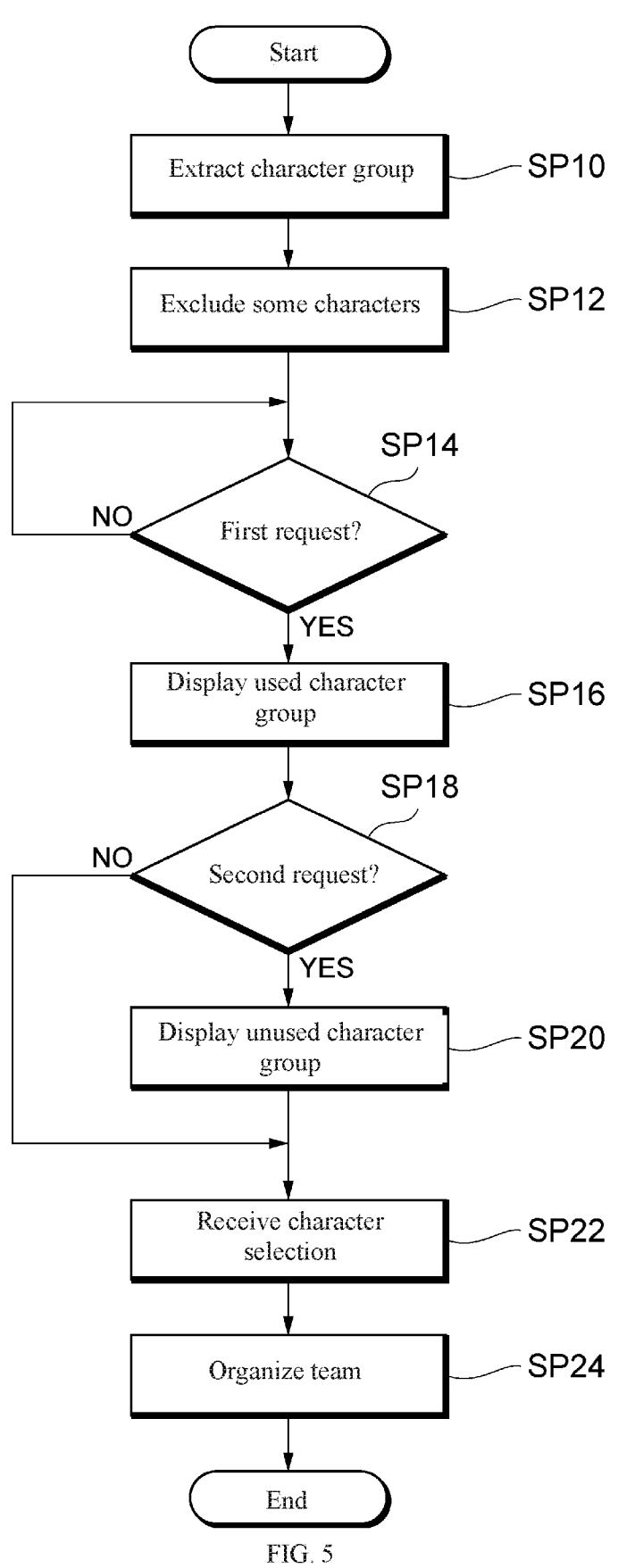
FIG. 5 is a flowchart showing an example of the flow of processing performed by each of the functional units shown in FIG. 4 in the game system according to the first embodiment.

FIG. 5 is a flowchart showing an example of the flow of processing performed by each of the functional units shown in FIG. 4 in the game system according to the first embodiment. Also, the processing of the following steps is started, for example, at the point when an organization menu is displayed for organizing characters to be used in a quest. The order and details of the following steps can be changed as needed.

Step SP10

The extraction unit 52 refers to the usage status and the possessed character information of the player information 50A, and extracts, from the player's possessed characters, used character groups whose usage status satisfies a specific condition and unused character groups whose usage status does not satisfy a specific condition. This specific condition is, for example, that the number of uses in a game (such as a quest) by the player is equal to or greater than the first specific number of times during a period from the specific time in the past (such as a month ago) up to the present. Then, the processing moves to the processing of step SP12.

Step SP12

The extraction unit 52 excludes some characters from the unused character group (character group not satisfying the specific condition) extracted in step SP10, and adds these to the used character group. For example, the extraction unit 52 excludes from the unused character group any characters to which evolved characters have been added via a game update during a period from a specific time in the past up to the present, or characters acquired by the player during a period from a specific time in the past up to the present, and extracts these as the used character group. Then, the processing moves to the processing of step SP14.

Step SP14

The reception unit 54 determines whether or not a first request has been received from the player. In the first embodiment, the reception unit 54 determines whether the player has issued an operation instruction from the organization menu to organize (organize one by one or collectively) the characters to be used in the quest. This operation instruction may be given multiple times. If the determination is positive, the processing then moves to the processing of step SP16. On the other hand, if the determination is negative, the processing moves to the processing of step SP14.

Step SP16

The control unit 56 causes the touch panel 32 to display a screen on which the unused character group extracted in steps SP10 and SP12 is excluded from the possessed characters. In other words, the control unit 56 causes the touch panel 32 to display a possessed character screen showing the used character group extracted by the extraction unit 52.

Figure 6A:
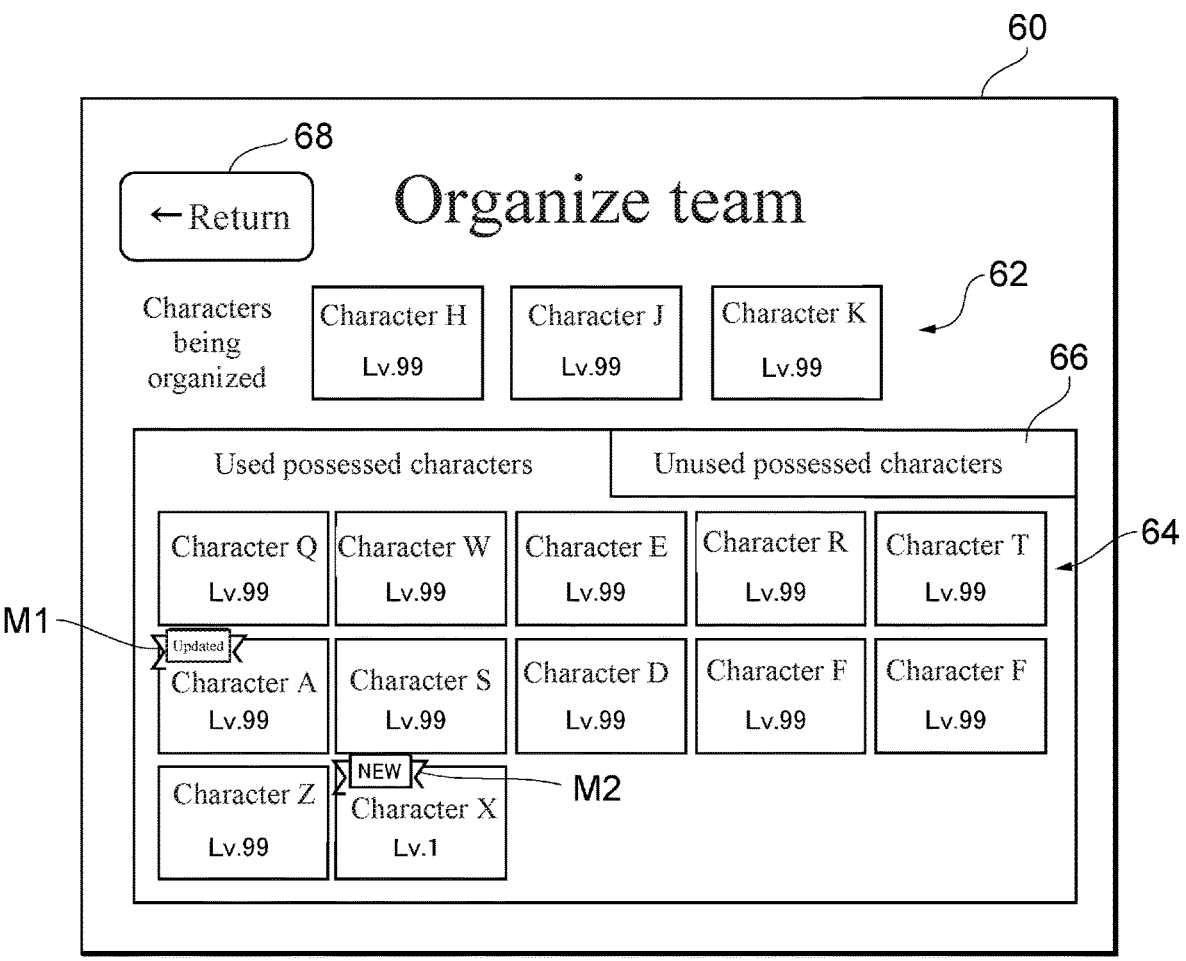
FIG. 6A is a diagram showing an example of a possessed character screen showing a used character group according to the first embodiment.

FIG. 6A is a diagram showing an example of a possessed character screen 60 showing a used character group according to the first embodiment.

As shown in FIG. 6A, the possessed character screen 60 showing the used character group is provided with an area for information about characters being organized 62, a possessed character information area 64, a display switching button 66, and a return button 68. Possessed characters organized into a team are displayed in the area for information about characters being organized 62. The characters included in the used character group are displayed in the possessed character information area 64. The characters are displayed in order in the possessed character information area 64, starting with the character with the highest the number of uses at the top, for example. A mark M1 indicating that an evolved character has been added via a recent game update to the characters excluded from the unused character group in step SP12 and extracted as the used character group, or a mark M2 indicating that a character has been acquired recently, is attached in the possessed character information area 64. The display switching button 66 is a display tab switching button for displaying the unused character group. The return button 68 is an instruction button for moving (returning) to the screen on which the organization menu is displayed.

Going back to FIG. 5, the processing moves to the processing of step SP18.

Step SP18

The reception unit 54 determines whether or not a second request has been received from the player. In the first embodiment, the reception unit 54 determines whether the player has issued an operation instruction by pressing the display switching button (display tab switching instruction). If the determination is positive, the processing then moves to the processing of step SP20. On the other hand, if the determination is negative, the processing moves to the processing of step SP22.

Step SP20

The control unit 56 causes the touch panel 32 to display a screen on which the used character group extracted in steps SP10 and SP12 is excluded from the possessed characters. In other words, the control unit 56 causes the touch panel 32 to display a possessed character screen showing the unused character group extracted by the extraction unit 52.

Figure 6B:
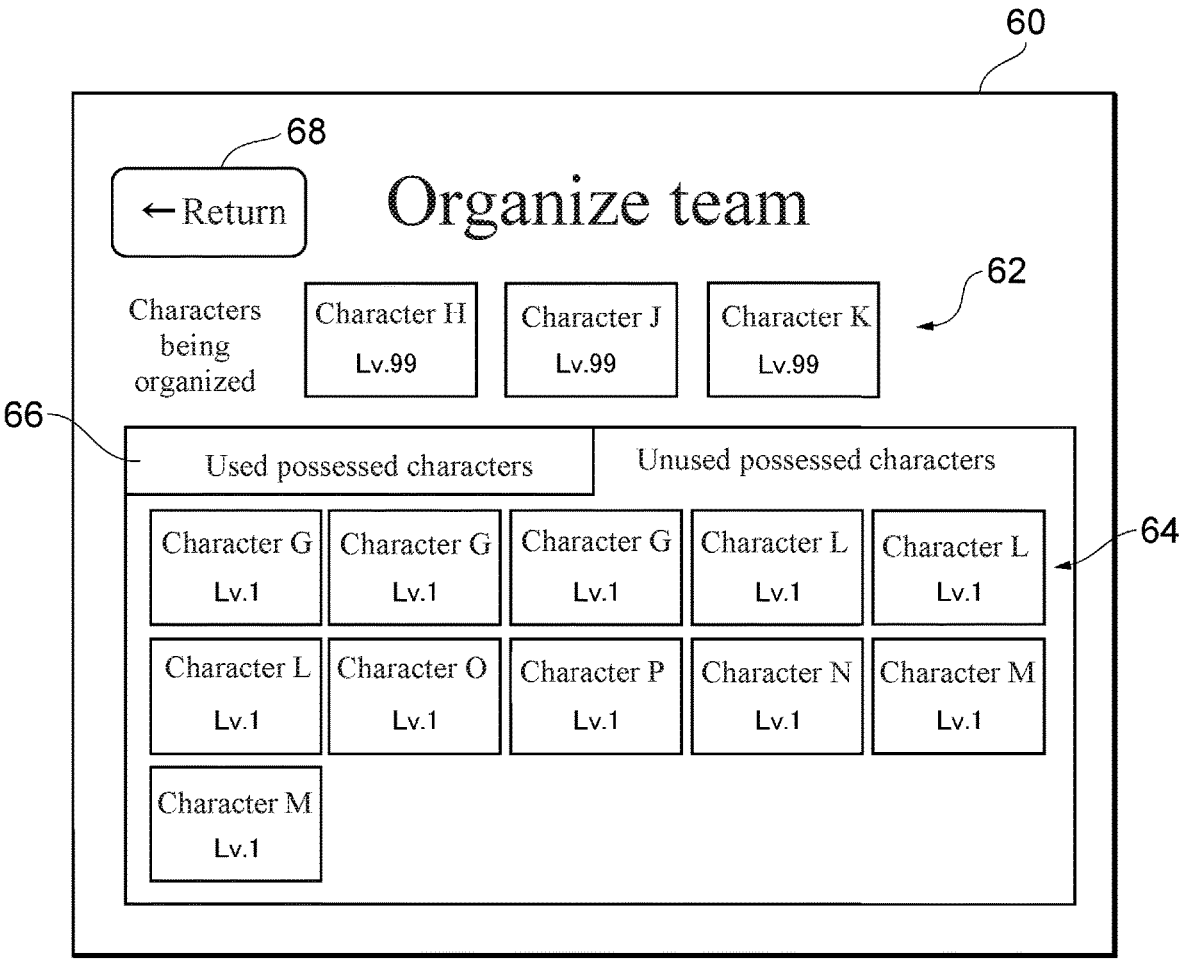
FIG. 6B is a diagram showing an example of the possessed character screen showing an unused character group according to the first embodiment.

FIG. 6B is a diagram showing an example of the possessed character screen 60 showing an unused character group according to the first embodiment.

As shown in FIG. 6B, the possessed character screen 60 showing the unused character group is provided with an area for information about characters being organized 62, a possessed character information area 64, a display switching button 66, and a return button 68. The characters included in the extracted unused character group are displayed in the possessed character information area 64. The display switching button 66 is a display tab switching button for displaying the used character group.

Going back to FIG. 5, the processing moves to the processing of step SP22.

Step SP22

The reception unit 54 receives from the player an instruction to select one or more characters in the possessed character information area of the possessed character screen. Then, the processing moves to the processing of step SP24.

Step SP24

The control unit 56 replaces one or more characters for which a selection instruction has been received in step SP22 with a character being organized. Then, the processing ends the processing series shown in FIG. 5.

In the first embodiment above, a computer is made to function as a storage unit 50 for storing the usage status in a game for each of player's possessed contents, an extraction unit 52 for extracting a content group whose usage status does not satisfy a specific condition from the possessed contents, a reception unit 54 for receiving a first request from the player to browse the possessed contents, and a control unit 56 for displaying a screen excluding the content group from the possessed contents in response to the first request, wherein the first request is a request for selecting a content to be used in the game from the possessed contents.

With this configuration, since the first request causes the display of a screen on which content groups whose usage status does not satisfy the specific condition are excluded from the possessed contents, when selecting the content to be used, it is less likely that the browsability of the possessed contents will be diminished (that browsing will be made more complicated).

Also, in the first embodiment, the usage status includes the number of uses during a period from a specific time in the past up to the present.

With this configuration, when selecting the content to be used, the possessed contents that have been recently used are displayed, so the possessed contents that are most likely to be used by the player in a game can be browsed.

Also, in the first embodiment, the number of uses is the number of uses by the player in a game, and the specific condition is that the number of uses is equal to or greater than the first specific number of times.

With this configuration, the possessed contents used by the player in a game are displayed, so the possessed contents that are most likely to be used by the player in a game can be browsed.

Also, in the first embodiment, the number of uses is the number of uses by a plurality of players in a game, and the specific condition is that the number of uses is equal to or greater than the second specific number of times.

With this configuration, the possessed contents used by a plurality of players are displayed, so it is possible to encourage the player to use that contents, which motivates the player to play the game.

Also, in the first embodiment, the number of uses is the number of uses in a quest.

With this configuration, since the first request causes the possessed contents used in a quest to be displayed, the possessed contents that are most likely to be used by the player can be browsed.

Also, in the first embodiment, the number of uses is the number of uses in clearing a quest.

With this configuration, since the first request can cause the possessed contents used for clearing a quest to be displayed, the possessed contents that are most likely to be used by the player can be browsed.

Also, in the first embodiment, the number of uses is the number of times a breeding game has been played.

With this configuration, the first request can cause the possessed contents with which a breeding game is being played to be displayed, so the possessed contents that are most likely to be used by the player can be browsed.

Also, in the first embodiment, after receiving the first request, the reception unit 54 receives from the player a second request to browse content groups, and the control unit 56 displays content groups on the screen in response to the second request.

With this configuration, possessed contents that are not being used can be displayed by the second request after the first request, so it is less likely that the browsability of the possessed contents will be diminished (that browsing will be made more complicated).

Also, in the first embodiment, the extraction unit 52 excludes from the content group any content whose usage status does not satisfy the specific conditions and to which the evolved content was added via a game update during a period from a specific time in the past up to the present.

With this configuration, since the first request causes the contents to which evolved content has been added via a recent game update to be displayed, it is possible to encourage the player to use that contents.

Also, in the first embodiment, the extraction unit 52 excludes from the content group any content whose usage status does not satisfy the specific condition which the player acquired during a period from a specific time in the past up to the present.

With this configuration, since the first request causes recently acquired contents to be displayed, it is possible to encourage the player to use that contents.

Second Embodiment

A second embodiment will now be described.

The second embodiment differs from the first embodiment in that the first request is a request for selecting a character to be discarded from the possessed characters, and the control unit 56 displays a screen on which the used character group is excluded from the possessed characters in response to the first request. Aspects of the configuration and functions of the game system according to the second embodiment that are the same as those of the game system according to the first embodiment are omitted from the description below.

In the second embodiment, the reception unit 54 receives a request from the player to select a character to be discarded from the possessed characters as a first request to browse the possessed characters. Examples of this first request are an operation instruction to sell a character, an operation instruction to select a resource character in a breeding game, etc. An example of this operation instruction to select a resource character is an operation instruction to select, from the possessed characters, a resource character to be fused with a base character after the base character has been selected from the possessed characters in the strengthening fusion menu.

Also, in the second embodiment, after receiving the first request, the reception unit 54 receives from the player a second request to browse the used character group. An example of this second request is an operation instruction to display a used character group that is displayed after having been excluded from the possessed characters by the control unit 56. An example of this operation instruction is pressing a display switch button of a tab associated with the used character group, or the like.

In the second embodiment, in response to the first request received by the reception unit 54, the control unit 56 produces a display that excludes the group of characters (used character group) extracted from the possessed characters by the extraction unit 52 whose usage status satisfies a specific condition. That is, when the player sells a possessed character or discards one as a resource character, the control unit 56 displays, from among the possessed characters, an unused character group whose characters the player has not used during a period from a specific time in the past up to the present.

Also, in the second embodiment, in response to the second request received by the reception unit 54, the control unit 56 displays on the possessed character screen the character group (used character group) extracted by the extraction unit 52 whose usage status satisfies a specific condition. For example, the control unit 56 switches from a screen displaying the unused character group to a screen displaying the used character group in response to the second request.

Processing Flow

Figure 7:
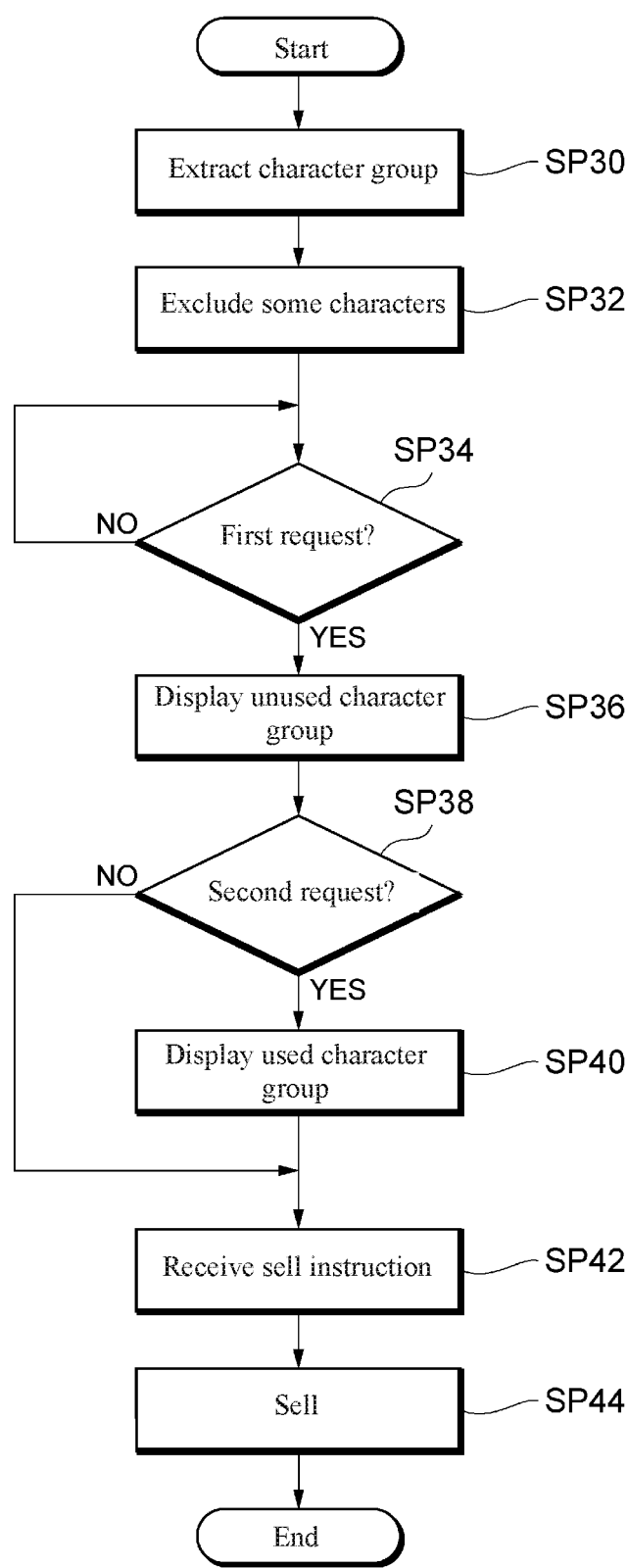
FIG. 7 is a flowchart showing an example of the flow of processing performed by each of the functional units in the game system according to a second embodiment.

FIG. 7 is a flowchart showing an example of the flow of processing performed by each of the functional units in the game system according to the second embodiment. Also, the processing of the following steps is started, for example, at the point when the selling menu for selling possessed characters is displayed. The order and details of the following steps can be changed as needed.

Steps SP30 to SP32

The processing of steps SP30 to SP32 is the same as the processing of steps SP10 to SP12 described above, and therefore will not be described again. Then, the processing moves to the processing of step SP34.

Step SP34

The reception unit 54 determines whether or not a first request has been received from the player. In the second embodiment, the reception unit 54 determines whether the player has issued an operation instruction to select the selling menu. This operation instruction may be given multiple times. If the determination is positive, the processing then moves to the processing of step SP36. On the other hand, if the determination is negative, the processing moves to the processing of step SP34.

Step SP36

The control unit 56 causes the touch panel 32 to display a screen on which the used character group extracted in steps SP30 and SP32 is excluded from the possessed characters. In other words, the control unit 56 causes the touch panel 32 to display a possessed character screen showing the unused character group extracted by the extraction unit 52.

Figure 8A:
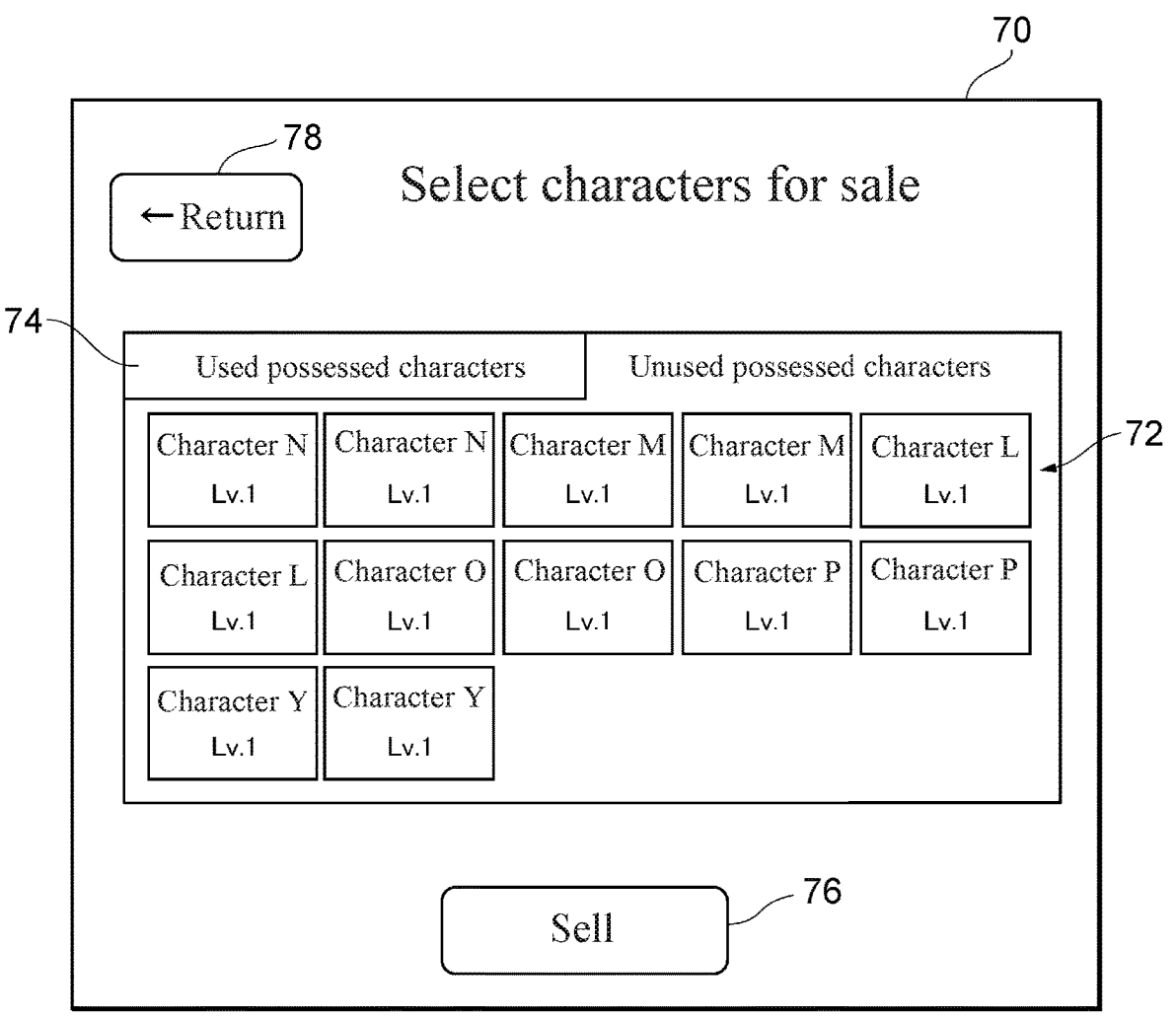
FIG. 8A is a diagram showing an example of the possessed character screen showing an unused character group according to the second embodiment.

FIG. 8A is a diagram showing an example of a possessed character screen 70 showing an unused character group according to the second embodiment.

As shown in FIG. 8A, the possessed character screen 70 showing the unused character group is provided with a possessed character information area 72, a display switching button 74, a sell button 76, and a return button 78. The characters included in the unused character group are displayed in the possessed character information area 72. The display switching button 74 is a display tab switching button for displaying the used character group. The sell button 76 is an instruction button for selling a possessed character selected by the player. The return button 78 is an instruction button for moving (returning) to the screen on which the selling menu is displayed.

Going back to FIG. 7, the processing moves to the processing of step SP38.

Step SP38

The reception unit 54 determines whether or not a second request has been received from the player. In the second embodiment, the reception unit 54 determines whether the player has issued an operation instruction by pressing the display switching button (display tab switching instruction). If the determination is positive, the processing then moves to the processing of step SP40. On the other hand, if the determination is negative, the processing moves to the processing of step SP42.

Step SP40

The control unit 56 causes the touch panel 32 to display a screen on which the unused character group extracted in steps SP30 and SP32 is excluded from the possessed characters. In other words, the control unit 56 causes the touch panel 32 to display a possessed character screen showing the used character group extracted by the extraction unit 52.

Figure 8B:
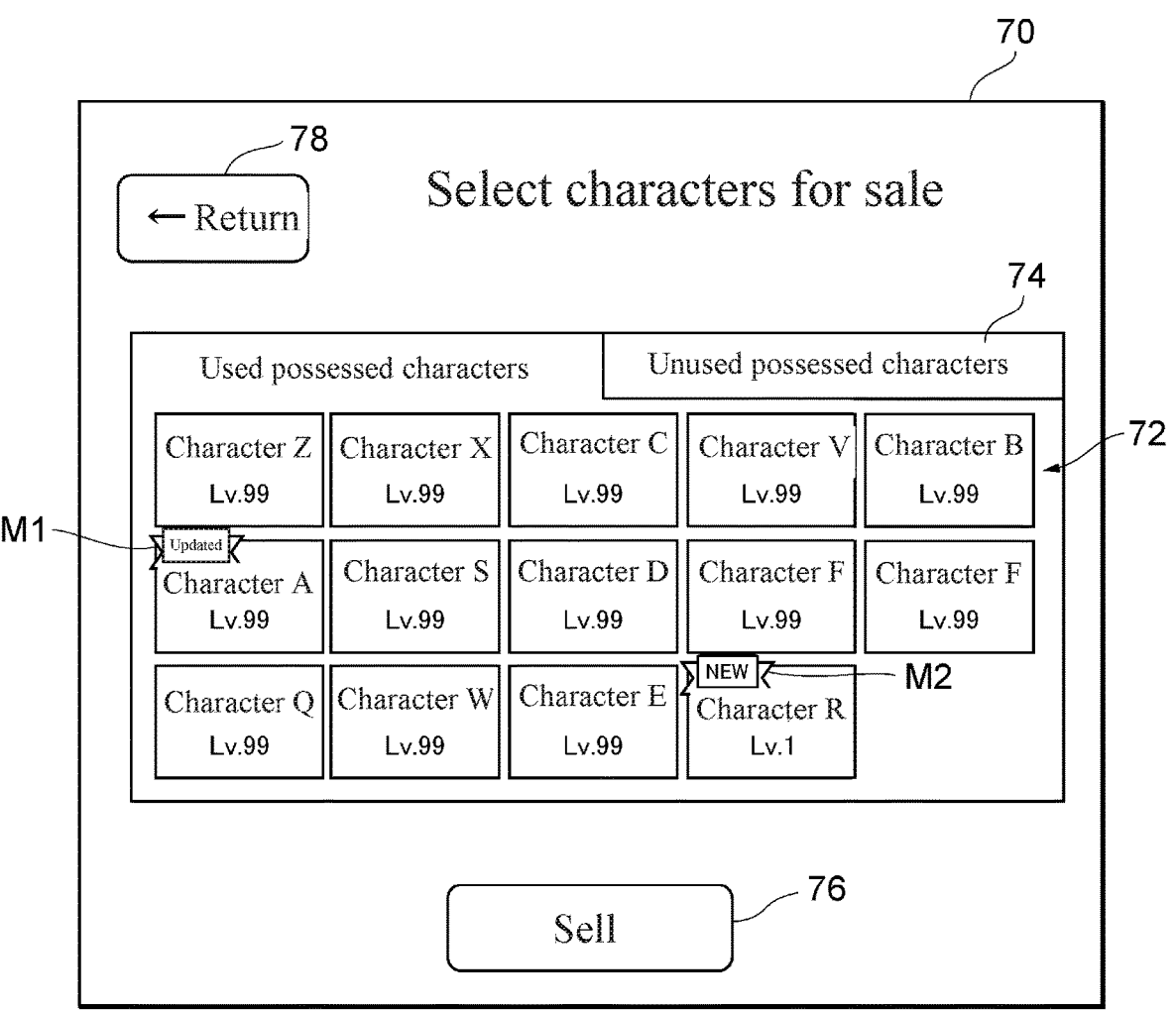
FIG. 8B is a diagram showing an example of the possessed character screen showing a used character group according to the second embodiment.

FIG. 8B is a diagram showing an example of the possessed character screen 70 showing a used character group according to the second embodiment.

As shown in FIG. 8B, the possessed character screen 70 showing the used character group is provided with a possessed character information area 72, a display switching button 74, a sell button 76, and a return button 78. The characters included in the used character group are shown in the possessed character information area 72. A mark M1 indicating that an evolved character has been added via a recent game update to the characters excluded from the unused character group in step SP32 and extracted as the used character group, or a mark M2 indicating that a character has been acquired recently, is attached in the possessed character information area 72. The display switching button 74 is a display tab switching button for displaying the unused character group.

Going back to FIG. 7, the processing moves to the processing of step SP42.

Step SP42

The reception unit 54 receives the pressing of the sell button after the player has selected one or more characters in the possessed character information area of the possessed character screen. Then, the processing moves to the processing of step SP44.

Step SP44

The control unit 56 sells the one or more characters selected by the player, and allows the player to acquire coins corresponding to the characters. Then, the processing ends the processing series shown in FIG. 7.

In the second embodiment above, a computer is made to function as a storage unit 50 for storing the usage status in a game for each of player's possessed contents, an extraction unit 52 for extracting a content group whose usage status satisfy a specific condition from the possessed contents, a reception unit 54 for receiving a first request from the player to browse the possessed contents, and a control unit 56 for displaying a screen excluding the content group from the possessed contents in response to the first request, wherein the first request is a request for selecting the content to be discarded from the possessed contents.

With this configuration, since the first request causes the display of a screen on which content groups whose usage status satisfies the specific condition are excluded from the possessed contents, when selecting the content to be discarded, it is less likely that the browsability of the possessed contents will be diminished (that browsing will be made more complicated).

Also, in the second embodiment, the usage status includes the number of uses during a period from a specific time in the past up to the present.

With this configuration, when selecting the content to be discarded, possessed contents that have not been recently used are displayed, so the possessed contents that are most likely to be discarded by the player can be browsed.

Also, in the second embodiment, the number of uses is the number of uses by the player in a game, and the specific condition is that the number of uses is equal to or greater than the first specific number of times.

With this configuration, the possessed contents that are not used by the player in a game are displayed, so the possessed contents that are most likely to be discarded by the player can be browsed.

Also, in the second embodiment, the number of uses is the number of uses by a plurality of players in a game, and the specific condition is that the number of uses is equal to or greater than the second specific number of times.

With this configuration, possessed contents that are not being used by a plurality of players are displayed, so it is possible to encourage the player to discard that contents.

Also, in the second embodiment, the number of uses is the number of uses in a quest.

With this configuration, since the first request causes the possessed contents that are not being used in a quest to be displayed, the possessed contents that are most likely to be discarded by the player can be browsed.

Also, in the second embodiment, the number of uses is the number of uses in clearing a quest.

With this configuration, since the first request can cause the possessed contents that are not being used for clearing a quest to be displayed, the possessed contents that are most likely to be discarded by the player can be browsed.

Also, in the second embodiment, the number of uses is the number of times a breeding game has been played.

With this configuration, the first request can cause the possessed contents with which a breeding game is not being played to be displayed, so the possessed contents that are most likely to be discarded by the player can be browsed.

Also, in the second embodiment, after receiving the first request, the reception unit 54 receives from the player a second request to browse content groups, and the control unit 56 displays content groups on the screen in response to the second request.

With this configuration, the possessed contents that are being used can be displayed by the second request after the first request, so it is less likely that the browsability of the possessed contents will be diminished (that browsing will be made more complicated).

Also, in the second embodiment, the extraction unit 52 extracts as the content group any content whose usage status does not satisfy the specific conditions and to which the evolved content was added via a game update during a period from a specific time in the past up to the present.

With this configuration, since the first request causes the contents to which evolved content has been added via a recent game update not to be displayed, it is possible to discourage the player from discarding that contents.

Also, in the second embodiment, the extraction unit 52 makes into the content group any content whose usage status does not satisfy the specific condition and which the player acquired during a period from a specific time in the past up to the present.

With this configuration, since the first request causes recently acquired contents not to be displayed, it is possible to discourage the player from discarding that contents.

Modification

The present invention is not limited to or by the above specific examples. That is, suitable design changes made to the above specific examples by a person skilled in the art are also encompassed by the scope of the present invention as long as they still have the features of the present invention. Also, the elements of the embodiments described above and the modified examples (discussed below) can be combined to the extent that this is technically possible, and these combinations are also encompassed by the scope of the present invention as long as they still have the features of the present invention.

For example, in the first embodiment and the second embodiment, a case was described in which the usage status was stored for each possessed character, including the number of uses during a period from a specific time in the past up to the present, but the number of uses for just some of the characters may be stored. Examples of "some of the characters" include characters that are unlikely to be used as a base character in a quest or a breeding game, such as strengthening resource characters and evolution resource characters.

Also, this specific period may differ from one player to the next. For example, the specific period may be one week if the player plays the game at least twice a week, or may be one month if the player plays the game at least once a week, or may be three months if the player plays less frequently than once a week.

Also, the number of uses may be a numerical value representing the usage status of a possessed character, and may be a value obtained by multiplying the number of uses by a coefficient or some other numerical value.

Also, in the first and second embodiments, a case was described in which the extraction unit 52 extracted a used character group and an unused character group at the point when the organization menu or the selling menu was displayed, but the used character group and the unused character group may be extracted at a specific time (such as midnight), the point when the player logs into the game, the point when the player uses a character, or the like.

Also, in the first embodiment and the second embodiment, a case was described in which the extraction unit 52 extracted, as the used character group, characters to which evolved characters had recently been added via a game update, or characters recently acquired by the player, but the control unit 56 may instead display these characters separately from the used character group and the unused character group on the possessed character screen. For example, on the possessed character screen, the control unit 56 may display characters to which evolved characters have recently been added via a game update, or characters recently acquired by the player, in tabs different from the used character group and the unused character group. The control unit 56 may display these tabs in response to a first request, or may display them in response to a request to display these tabs.

Also, in the first and the second embodiments, characters were mainly used as an example of contents, but various items (weapons, armor, jewels, etc.), cards, avatars, coins, points, etc., may also be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . service device, 12 . . . terminal device, 50 . . . storage unit, 52 . . . extraction unit, 54 . . . reception unit, 56 . . . control unit

What is claimed is:

1. A non-transitory computer readable recording medium storing instructions that cause a computer to function as:

a storage device that stores a usage status of each of player's possessed contents in a game; and a control device that:

extracts, from the possessed contents, an unused content group having the usage status that does not satisfy a specific condition, based on a game status during a period from a specific prior time up to a present time, excludes a predetermined content from the unused content group, receives, from a player via a terminal device comprising a display, a first request to browse the possessed contents, and in response to the first request, causes the display of the terminal device to display a screen including a list of all the possessed contents except the unused content group, wherein the first request is a request for selecting, from the possessed contents, a content to be used in the game.

2. The non-transitory computer readable recording medium according to claim 1, wherein the usage status includes a number of uses during the period.

3. The non-transitory computer readable recording medium according to claim 2, wherein the number of uses is a number of uses by the player in the game, and the specific condition is that the number of uses is equal to or greater than a first specific number of times.

4. The non-transitory computer readable recording medium according to claim 2, wherein the number of uses is a number of uses by a plurality of players in the game, and the specific condition is that the number of uses is equal to or greater than a second specific number of times.

5. The non-transitory computer readable recording medium according to claim 3, wherein the number of uses is a number of uses in a quest.

6. The non-transitory computer readable recording medium according to claim 3, wherein the number of uses is a number of uses in clearing a quest.

7. The non-transitory computer readable recording medium according to claim 3, wherein the number of uses is a number of times a breeding game has been played.

8. The non-transitory computer readable recording medium according to claim 1, wherein the control device further:

receives, from the player via the terminal device, a second request to browse the unused content group after receiving the first request, and in response to the second request, causes the display of the terminal device to display a list of all contents contained in the unused content group on the screen.

9. The non-transitory computer readable recording medium according to claim 1, wherein the predetermined content is a content to which an evolved content has been added via a game update during the period.

10. The non-transitory computer readable recording medium according to claim 1, wherein the predetermined content is a content having been acquired by the player during the period.

11. An information processing device, comprising:

a storage device that stores a usage status of each of player's possessed contents in a game; and a control device that:

extracts, from the possessed contents, an unused content group having the usage status that does not satisfy a specific condition, based on a game status during a period from a specific prior time up to a present time, excludes a predetermined content from the unused content group, receives, from a player via a terminal device comprising a display, a first request to browse the possessed contents, and in response to the first request, causes the display of the terminal device to display a screen including a list of all the possessed contents except the unused content group, wherein the first request is a request for selecting, from the possessed contents, a content to be used in the game.

* * * * *